June 16, 1936.  M. WINCKLER  2,044,195
PROCESS OF HEATING SUBSTANCES
Filed Aug. 13, 1932
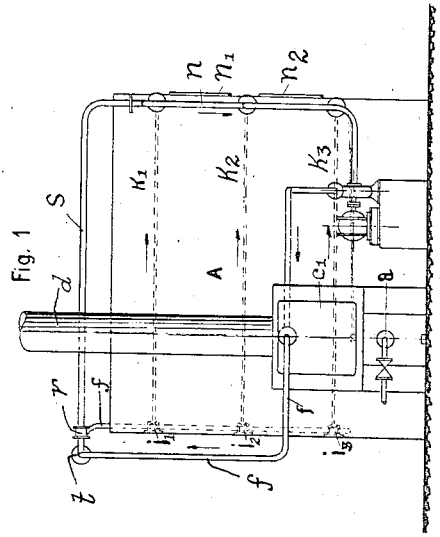
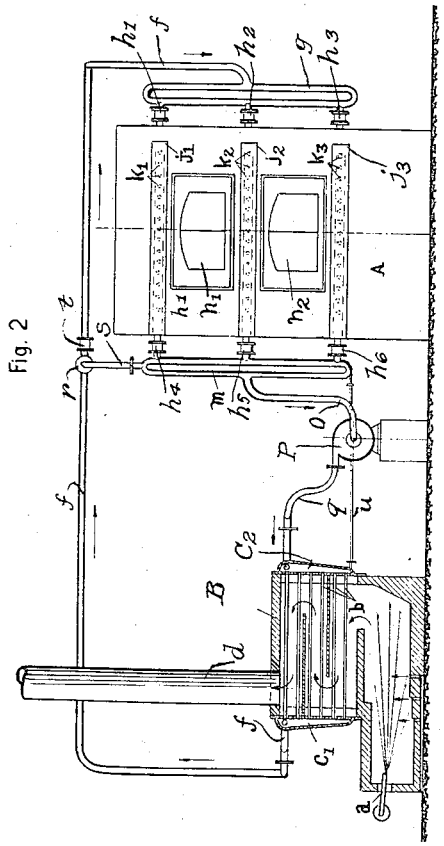
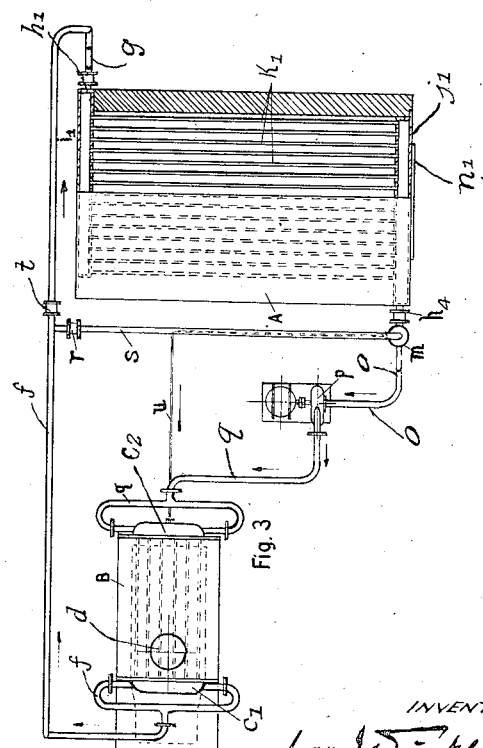

Patented June 16, 1936

2,044,195

UNITED STATES PATENT OFFICE 2,044,195

PROCESS OF HEATING SUBSTANCES

Max Winckler, Miltitz, near Leipzig, Germany

Application August 13, 1932, Serial No. 628,763
In Germany August 21, 1931

2 Claims. (Cl. 237—81)

This invention relates to a process for heating substances by forced circulation of steam through a superheater and past a point, spacially separated therefrom, at which heat is given up. Under the expression "heating substances" it is to be understood, for example, the drying of substances or articles, the thickening or heating of liquids of high boiling point, the baking of bread or heating of articles for other purposes. The invention consists in this, that the superheater serves as the sole producer of steam during the starting up and the operation of the plant, the steam conduit system, the superheater and the circulating unit being dimensioned so that the steam leaving the point at which heat is given up returns to the superheater without condensation. As short a path as possible may advantageously be provided for the superheated steam at the heating point by having several passages running parallel to one another.

The process may be employed more particularly where it is necessary to secure perfectly definite heating temperatures since the superheating may be fixed with extraordinary accuracy. The limits up to which the steam can be superheated are substantially higher than the boiling temperatures of oils of even the highest boiling points; furthermore, steam which is cheap may be used in place of the expensive oils which in the course of a comparatively short time become impaired by the superheating and unsuitable for further use. In the baking of bread and the like the process has, for example, the advantage that there is no danger of explosion. Of course, steam of atmospheric pressure as well as steam at pressure above or below atmospheric may be used. In most cases the use of a pressure below that of the atmosphere will be avoided, since otherwise any leaks in the apparatus give rise to suction of air or other gases.

A steam blower may advantageously be employed in the present case as a pump; by it all resistances in the conduits and in the apparatus may be overcome with ease. Such steam velocity may everywhere be produced herewith that the steam remains superheated even beyond the place at which it is utilized right up to the superheater, so that no condensation of the steam can take place.

The apparatus may advantageously be formed in such a way that many steam passages connected up in parallel are obtained, in order to concentrate the heat in the desired places as much as possible and to prevent condensation by having short steam passages.

In the accompanying drawing, the present invention is diagrammatically illustrated by way of example in connection with a baking or drying oven.

Figure 1 is a front view of an oven in accordance with the present invention with a superheater in front of the same, Figure 2 is a side elevation of Figure 1 viewed from the right with the superheater in section, and Figure 3 is a plan view of Figure 2.

In the drawing, A indicates a baking oven, B a superheater arranged apart from the baking oven. The superheater is heated by an oil burner $a$. This superheater has also steam pipes $b$ which communicate with steam chambers $c_1$ $c_2$. The heating gases escape from a chimney $d$. A pipe $f$ communicates with the chamber $c_1$ and extends to a closed pipe $g$ at the rear end of the oven. Closable and preferably chamber-like steam pipes $i_1$, $i_2$ and $i_3$ communicate through steam passage means $h_1$, $h_2$, $h_3$ with the pipe $g$ at the rear end of the oven. There are provided at the front of the baking oven A chamber-like steam pipes $j_1$, $j_2$, $j_3$ which communicate with the chamber-like steam pipes $i_1$, $i_2$, $i_3$ through intermediate series of pipes $k_1$, $k_2$, $k_3$ which are parallel to each other and extend rectilinearly to said chamber-like pipes. The steam pipes $j_1$, $j_2$, $j_3$ communicate through steam exhaust means $h_4$, $h_5$, $h_6$ with a closed pipe $m$. $n_1$, $n_2$ are baking oven doors leading to baking or drying chambers which are provided between the steam pipes $k_1$, $k_2$, $k_3$. The closed pipe $m$ communicates through a pipe $o$ with a blower $p$ which communicates through a pipe $q$ with the steam chamber $c_2$ of the superheater B.

The apparatus operates as follows:

A small quantity of water is maintained in the closed system. When the burners are ignited, the water within the superheater becomes vaporized, thus providing a working medium. This steam eventually becomes superheated, and passes through the system in the following manner.

The superheated steam passes from the chamber $c_1$ through the pipe $f$ to the closed pipe $g$ at the rear end of the oven. According to the position of the steam passage means $h_1$, $h_2$, $h_3$, the steam enters the pipes $k_1$, $k_2$, $k_3$, by way of pipes $i_1$, $i_2$, $i_3$, respectively, where it delivers its heat to the oven chambers during regular working conditions without being condensed. After the delivery of heat, the steam passes through pipes $j_1$, $j_2$, $j_3$, and the steam exhaust means $h_4$, $h_5$, $h_6$ into the pipes $m$, $o$ and is forced by the fan $p$ through the pipe $q$ to the chamber $c_2$ of the superheater B wherein it is again heated.

If the oven A is not working to its full extent, a portion of the steam may be passed from pipe $f$ through a pipe $s$ to the pipe $m$ by opening a steam valve $r$ and then returned to the superheater together with the superheated steam rendered effective in the oven. If the entire baking oven A is to be rendered inoperative temporarily, an available valve $t$ on pipe $f$ may be closed and all the steam again returned directly, i. e. without being rendered effective, to the superheater B over the steam valve $r$, pipe $s$, etc. $u$ is a pipe which is adapted to return to the superheater B the water of condensation which is condensed during the period of rest.

I claim:

1. In a process for heating substances comprising the steps of initially vaporizing water in a superheating zone to produce superheated steam as a working medium, continuously superheating the steam, then passing the steam in indirect heat exchange relationship with the space to be heated and without causing condensation of the steam and thereupon returning the cooled steam to the superheating zone.

2. In a process for heating substances comprising the steps of initially vaporizing water in a superheating zone to produce superheated steam as a working medium, continuously superheating the steam, then passing the steam in a plurality of currents in indirect heat exchange relationship with the space to be heated and without causing condensation of the steam and thereupon returning the cooled steam to the superheating zone.

MAX WINCKLER.